Patented Dec. 25, 1928.

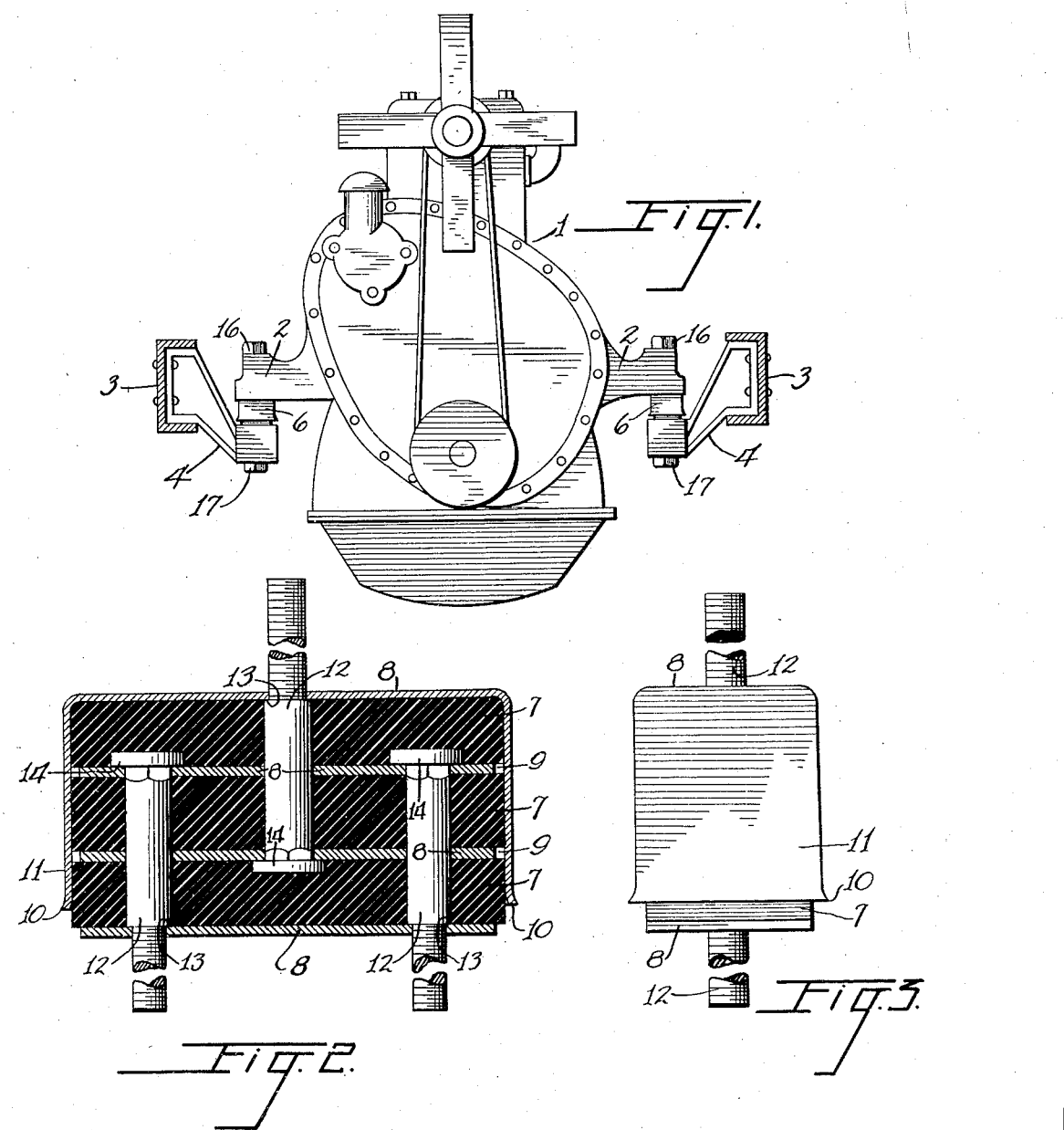

1,696,602

UNITED STATES PATENT OFFICE.

DELMER S. HARDER AND FRANK W. VROOMAN, OF OAKLAND, CALIFORNIA, ASSIGNORS TO DURANT MOTOR CO., OF OAKLAND, CALIFORNIA, A CORPORATION OF CALIFORNIA.

MOUNTING MEANS FOR VEHICLE ENGINES.

Application filed November 19, 1925. Serial No. 70,087.

The present invention relates to mounting means for internal combustion engines and is particularly designed to produce a cushioning effect whereby transmission of vibrations from the engine to its support and vice versa is prevented or at least lessened.

While our invention may be used in connection with any internal combustion engine, it was particularly developed for use in connection with motor vehicles or boats, but the fact that a motor vehicle has been used for the purpose of illustrating the idea of the present invention, is not to be construed as a limitation of our invention to that particular field.

Our invention has been particularly applied by us to a four cylinder vehicle engine and we have obtained very good results, our mounting means practically eliminating vibrations of the engine characteristic to the four cylinder automobile. In fact, we find in our experiments on one of the small four cylinders cars now on the market that with our mounting means the same runs as smooth, and as free of vibrations as any six cylinder car, even though driven at considerable speed.

It is proposed in our invention to mount the power plant of a motor vehicle on a cushioning element consisting principally of strata of rubber-like material alternating with sheets of metal, and provided with vertical stiffening members arranged to allow the rubber-like material to yield vertically, though opposing lateral movement.

Further objects and advantages of our invention will appear as the specification proceeds.

The preferred form of the invention is illustrated in the accompanying drawing, in which:

Figure 1 shows our mounting means in connection with the frame and power plant of a popular type of motor vehicle.

Figure 2 shows a vertical section through our mounting means, and

Figure 3 shows an end view of the same.

While we have shown only the preferred form of the invention, we wish to have it understood that various changes or modifications may be made within the scope of the claims hereto attached without departing from the spirit of the invention.

In Fig. 1 the power plant 1 of a motor vehicle is shown as having two brackets 2 extending laterally therefrom, while the chassis frame 3 also has brackets 4 extending therefrom in such a manner that the ends of the brackets 2 and 4 respectively register and allow our mounting means 6 to be interposed between the same.

Our mounting means is illustrated in detail in Figures 2 and 3 and comprises a plurality of strata 7 of rubber or rubber-like material alternating with sheets 8 of metal or similar rigid material, the sheets of material being slightly shorter than the strata of rubber, as shown at 9, so as to allow the latter to project beyond the same. The uppermost sheet of metal 8 is provided with a downwardly extending flange 11 surrounding the underlying strata of rubber and confining the same so as to prevent them from spreading. The lower extremity of the said flange is preferably flaring as at 10 to facilitate sliding motion of the cap relative to the rubber material. The uppermost sheet 8 with the flange 11 furthermore furnishes a cap for the whole device protecting the same from dust, oil and the like.

For fastening means we preferably use the bolts 12, one of which extends upwardly and two extend downwardly, each of the bolts being formed with a shoulder 13 bearing on the top or bottom plate respectively for firmly securing the latter to the brackets 2 or 4, respectively. The enlarged end of each bolt extends into the device and is formed with a head 14 engaging with one of the inner plates 8, the shank of the bolt being squared where it passes through the plate, whereby the bolt is held against turning. The inner ends of the bolts are arranged in such a manner as to stiffen the device against lateral movement without preventing vertical yielding of the same. The heads of the bolts further engage with different plates and a stratum of rubber material is interposed between the plates engaged by the upper and lower bolts respectively, all the bolts passing through this stratum. The bolts are dimensioned so that the whole device is under compression when assembled.

The bracket 2 extending from the engine is placed on the top plate 8 and secured by means of a nut 16 screwed on the threaded end of the upper bolt 12. The lower plate 8 lies flat on the upper face of the bracket 4 and is secured thereto by means of nuts 17 threaded on the ends of the lower bolts 12.

Lateral movement of the device is substantially eliminated by the vertical stiffening members as well as the cap 11 surrounding the strata of rubber material, while the latter strata yield more to vertical pressure and absorb vibrations between the vehicle frame and the motor.

We claim:

1. Vibration absorbing means of the character described, comprising strata of rubber-like material alternating with sheets of rigid material, and vertical fastening members projecting from top and bottom and extending inwardly and being anchored in intermediate rigid sheets so as not to interfere with vertical movement of the rubber-like strata.

2. A cushioning element of the character described comprising strata of rubber-like material alternating with sheets of rigid material, with vertical stiffening elements surrounding the said strata and other vertical stiffening elements passing through a number of sheets and strata and anchored in adjacent strata.

3. Vibration absorbing means of the character described, comprising strata of rubber-like material, anchoring sheets of rigid material to alternate with said strata, and stiffening members projecting from opposite ends substantially at right angles to the plane of said sheet and anchored therein in such a manner that a strata of rubber-like material is interposed between the anchoring sheets, said stiffening members to pass through a number of sheets and strata.

4. Vibration absorbing means of the character described, comprising strata of rubber-like material, anchoring sheets of rigid material to alternate with said strata, and stiffening members projecting from opposite ends substantially at right angles to the plane of said anchoring sheet, said members to be anchored to the sheet of rigid material in such a manner that a stratum of rubber-like material is interposed between two anchoring sheets and that the stiffening members pass through a number of sheets and strata and are anchored in intermediate rigid sheets.

In testimony whereof we affix our signatures.

DELMER S. HARDER.
FRANK W. VROOMAN.